US008251559B2

(12) United States Patent
Tatsumi et al.

(10) Patent No.: US 8,251,559 B2
(45) **Date of Patent: *Aug. 28, 2012**

(54) PROJECTOR TYPE VEHICLE LIGHT

(75) Inventors: Yoichi Tatsumi, Tokyo (JP); Yoshiaki Akiyama, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 463 days.

This patent is subject to a terminal disclaimer.

(21) Appl. No.: 12/465,934

(22) Filed: May 14, 2009

(65) Prior Publication Data

US 2010/0008100 A1 Jan. 14, 2010

(30) Foreign Application Priority Data

May 14, 2008 (JP) ................................. 2008-127264

(51) Int. Cl.
*F21V 11/00* (2006.01)
*B60Q 1/00* (2006.01)

(52) U.S. Cl. ......................... 362/539; 362/513; 362/516

(58) Field of Classification Search .................. 362/509, 362/513, 538, 539, 516
See application file for complete search history.

(56) References Cited

U.S. PATENT DOCUMENTS

2006/0056192 A1* 3/2006 Yagi et al. .................... 362/512
2006/0164852 A1* 7/2006 Mochizuki et al. ........... 362/539
2007/0247864 A1* 10/2007 Suzuki .......................... 362/538
2007/0247865 A1* 10/2007 Kinoshita et al. ............. 362/538

FOREIGN PATENT DOCUMENTS

JP 2007-213938 A 8/2007
JP 2008-027768 A 2/2008

* cited by examiner

*Primary Examiner* — John A Ward
(74) *Attorney, Agent, or Firm* — Kenealy Vaidya LLP

(57) ABSTRACT

A projector type vehicle light is provided that can reduce temperature increase of a solenoid due to heat generated by a light source, while a shade and a projection lens can be disposed closer to each other. The vehicle light can be formed as a headlight and can include a light source, a reflector, a shade, and a projection lens. The projector type vehicle light can further include a shade rotational shaft extending in a left-to-right direction, a base member configured to support the shade so that the shade can rotate around the shade rotational shaft, a solenoid for making the shade rotate between a low-beam position and a high-beam position, and a crank shaft configured to connect the solenoid with the shade for driving. The solenoid can be disposed just below the shade so that a moving direction of the plunger of the solenoid is aligned with the left-to-right direction of the projector type vehicle headlight.

18 Claims, 8 Drawing Sheets

Fig. 9A
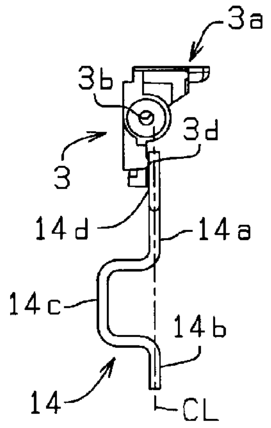
Fig. 9B
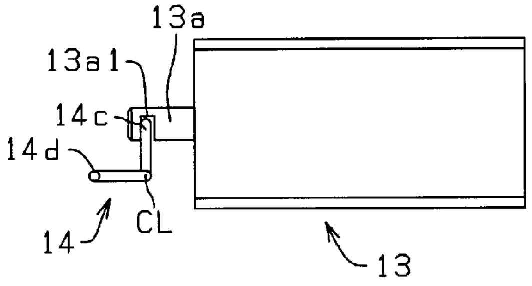
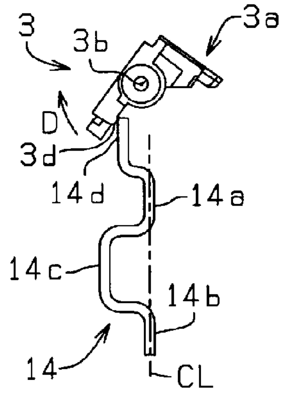
Fig. 9C
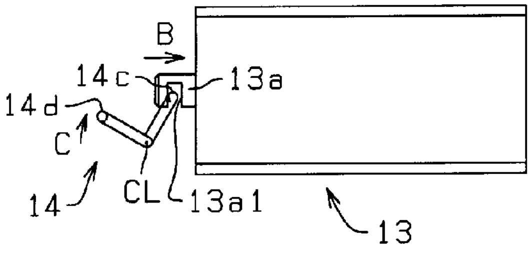
Fig. 9D

PROJECTOR TYPE VEHICLE LIGHT

This application claims the priority benefit under 35 U.S.C. §119 of Japanese Patent Application No. 2008-127264 filed on May 14, 2008, which is hereby incorporated in its entirety by reference.

BACKGROUND

1. Technical Field

The presently disclosed subject matter relates to a projector type vehicle light including a shade that can be rotated between a low-beam position and a high-beam position by a solenoid. In particular, the presently disclosed subject matter relates to a projector type vehicle headlight that can suppress the temperature increase of a solenoid due to the heat generated from a light source while the shade and the projection lens can be disposed closer to each other.

2. Description of the Related Art

Conventionally, various projector type vehicle headlights are known that include a light source, a reflector configured to reflect light from the light source, a shade configured to shield part of the light received from the reflector, and a projection lens configured to project light that is not shielded by the shade. Examples of this type of vehicle headlight include those shown in FIGS. 1 and 2 (corresponding to FIGS. 1 and 4 of Japanese Patent Application Laid-Open No. 2007-213938).

In the description of the present application, the directions for describing a light or headlight (front and rear, left and right, and up and down directions) are defined based on the state where the light is installed in a normal vehicle unless otherwise specifically defined.

The projector type vehicle headlight as shown in FIGS. 1 and 2 includes, in addition to the above basic components, a shade rotational shaft extending in a horizontal direction (left-to-right direction) of the headlight, a base member configured to support the shade around the shade rotational shaft so that the shade can rotate freely, a solenoid configured to rotate the shade between a low-beam position and a high-beam position, and a crank shaft for connecting the solenoid with the shade for driving and rotating of the shade.

In this structure, when the solenoid is turned off, the shade is disposed at the low-beam position to shield part of light from the reflector, thereby forming a low-beam light distribution pattern.

When the solenoid is turned on, the plunger of the solenoid is retracted to rotate the crank shaft connected thereto. Then, the rotated crank shaft can move the shade. As a result, the shade is allowed to be disposed at the high-beam position to form a high-beam light distribution pattern.

When the solenoid is disposed so that the moving direction of the plunger is aligned with the front-to-rear direction, the size of the vehicle headlight in the front-to-rear direction is relatively large. However, in this structure, the solenoid is disposed so that the moving direction of the plunger is aligned with the horizontal direction (left-to-right or side to side direction) of the projector type vehicle headlight, and therefore, the size of the vehicle headlight in the front-to-rear direction is relatively smaller than when the plunger moving direction is aligned in the front to rear direction.

When the solenoid is disposed behind the base member, the solenoid is heated by the light source. In contrast, in this structure, the solenoid is disposed in front of the base member for supporting the rotatable shade, and therefore, a temperature rise of the solenoid can be suppressed (better temperature control of the solenoid can be achieved). In this case, however, the shade and the projection lens are separated farther when compared with the case where the solenoid is not disposed in front of the base member for supporting the rotatable shade.

SUMMARY

The presently disclosed subject matter was devised in view of these and other characteristics, features, and problems and in association with the conventional art. According to an aspect of the presently disclosed subject matter, a projector type vehicle light can suppress temperature increase of a solenoid due to heat generated by a light source while the shade and the projection lens can be disposed closer to each other.

According to another aspect of the presently disclosed subject matter, a projector type vehicle light can include: a light source; a reflector configured to reflect light from the light source; a shade configured to shield part of light received from the reflector, having a shade rotational shaft extending in a left-to-right direction of the projector type vehicle light; a projection lens configured to project light not shielded by the shade; a base member configured to support the shade so that the shade can rotate around the shade rotational shaft; a solenoid having a plunger for making the shade rotate between a low-beam position and a high-beam position, the solenoid being disposed just below the shade so that a moving direction of the plunger is aligned with the left-to-right direction of the projector type vehicle light; and a crank shaft configured to connect the solenoid with the shade for driving the shade.

According to another aspect of the presently disclosed subject matter, the projector type vehicle light of the immediately above-described aspect can be configured such that the crank shaft includes a rotational center line extending in a vertical direction (up-and-down direction) of the projector type vehicle light and the base member includes bearing portions configured to support the crank shaft rotatably, the bearing portions disposed vertically with the plunger interposed therebetween.

According to another aspect of the presently disclosed subject matter, the projector type vehicle light of the immediately above-described aspect can be configured such that the plunger of the solenoid has a groove opened toward one direction, in particular rearward, so that the crank shaft is fit in the groove of the plunger.

According to yet another aspect of the presently disclosed subject matter, the projector type vehicle light of the immediately above-described aspect can be configured such that the shade has an abutment portion configured such that the crank shaft can abut against it, and the abutment portion is formed by a half of a cylindrical surface extending in the left-to-right direction of the projector type vehicle light.

The projector type vehicle light of the presently disclosed subject matter can include a shade that is disposed at the low-beam position when the solenoid is turned off so that the shade can shield part of light from the reflector to form a low-beam light distribution pattern. On the other hand, as the solenoid is turned on and the plunger thereof is retracted, the crank shaft connected to the plunger is allowed to be rotated. Then, the crank shaft abutting against the shade can move the shade rotationally to allow the shade to be disposed at the high-beam position. This configuration can provide a high-beam light distribution pattern.

The solenoid can be disposed such that the moving direction of the plunger of the solenoid is aligned with the left-to-right direction of the projector type vehicle light. Accordingly, when compared with the case where the solenoid is disposed so that the moving direction of the plunger of the solenoid is aligned with the front-to-rear direction, the size in the front-to-rear direction of the projector type vehicle light can be miniaturized.

In addition to this, the shade is disposed almost just above the solenoid. Accordingly, when compared with the case where the solenoid is disposed behind the shade, it is possible to prevent the solenoid from being heated by the light source. Furthermore, when compared with the case where the solenoid is disposed before the shade, the distance between the shade and the projection lens can be decreased.

The presently disclosed subject matter can prevent temperature increase of the solenoid due to exposure to the heat generated by the light source as well as decrease a distance between the shade and the projection lens.

According to another aspect of the presently disclosed subject matter, when compared with the case where a bearing for rotatably supporting the crank shaft is provided only at the upper side or lower side of the solenoid plunger, the axial deviation of the crank shaft can be suppressed so that the crank shaft can smoothly rotate.

When the solenoid is turned on or off, the plunger of the solenoid can move in the left-to-right direction of the projector type vehicle headlight. In this case, the rotational center axis of the crank shaft extends in the vertical direction of the projector type vehicle light, and the plunger of the solenoid can linearly move. Then, the trajectory of the contact point between the crank shaft and the plunger of the solenoid becomes approximately an arc around the rotational center axis as a center.

If a crank shaft is fit into a cylindrical hole of a plunger that linearly moves, in a projector type vehicle headlight as shown in FIG. 2 (corresponding to FIG. 4 of Japanese Patent Application Laid-Open No. 2007-213938), the contact point between the crank shaft and the plunger of the solenoid cannot move on an arc, meaning that the crank shaft cannot smoothly move.

In view of this, the plunger of the solenoid of the projector type vehicle light of the disclosed subject matter can include a groove opened toward one direction, in particular rearward. The crank shaft can be fit in the groove of the plunger.

In this state, the solenoid is turned on or off to move the plunger of the solenoid in the left-to-right direction. The input part of the crank shaft is fit into the groove of the plunger of the solenoid so that it relatively moves within the groove in the front-to-rear direction of the projector type vehicle light with respect to the plunger.

As a result, the contact point between the crank shaft and the plunger of the solenoid can move on an arc so that the crank shaft can smoothly rotate.

When the solenoid is turned on or off and the crank shaft is made to rotate, the trajectory of the contact point between the crank shaft and the shade can be an approximate arc when viewed from above (plan view) and from its side (side view).

If a crank shaft is fit into a groove of a shade in a projector type vehicle headlight as shown in FIG. 2 (corresponding to FIG. 4 of Japanese Patent Application Laid-Open No. 2007-213938), the contact point between the crank shaft and the shade cannot move on an arc, meaning that the crank shaft and the shade cannot smoothly rotate.

The shade of the presently disclosed subject matter can also include an abutment portion configured such that the crank shaft can abut against the abutment portion, and the abutment portion can be formed by a half of a cylindrical surface extending in the left-to-right direction of the projector type vehicle light.

In this state, when the solenoid is turned on or off to rotate the crank shaft, the output part of the crank shaft can move on the half cylindrical surface of the abutment portion of the shade.

As a result, the contact point between the output part of the crank shaft and the abutment portion of the shade can move on the approximate arc trajectory as seen in a plan view. Furthermore, the contact point between the crank shaft and the abutment portion of the shade can move on the approximate arc trajectory as seen in a side view so that the crank shaft and the shade can smoothly rotate.

BRIEF DESCRIPTION OF THE DRAWINGS

These and other characteristics, features, and advantages of the presently disclosed subject matter will become clear from the following description with reference to the accompanying drawings, wherein:

FIGS. 9A, 9B, 9C and 9D are schematic diagrams illustrating a linkage mechanism for rotating and moving the shade between the low-beam position and the high-beam position for the light of FIG. 3.

DETAILED DESCRIPTION OF EXEMPLARY EMBODIMENTS

Figure 3:
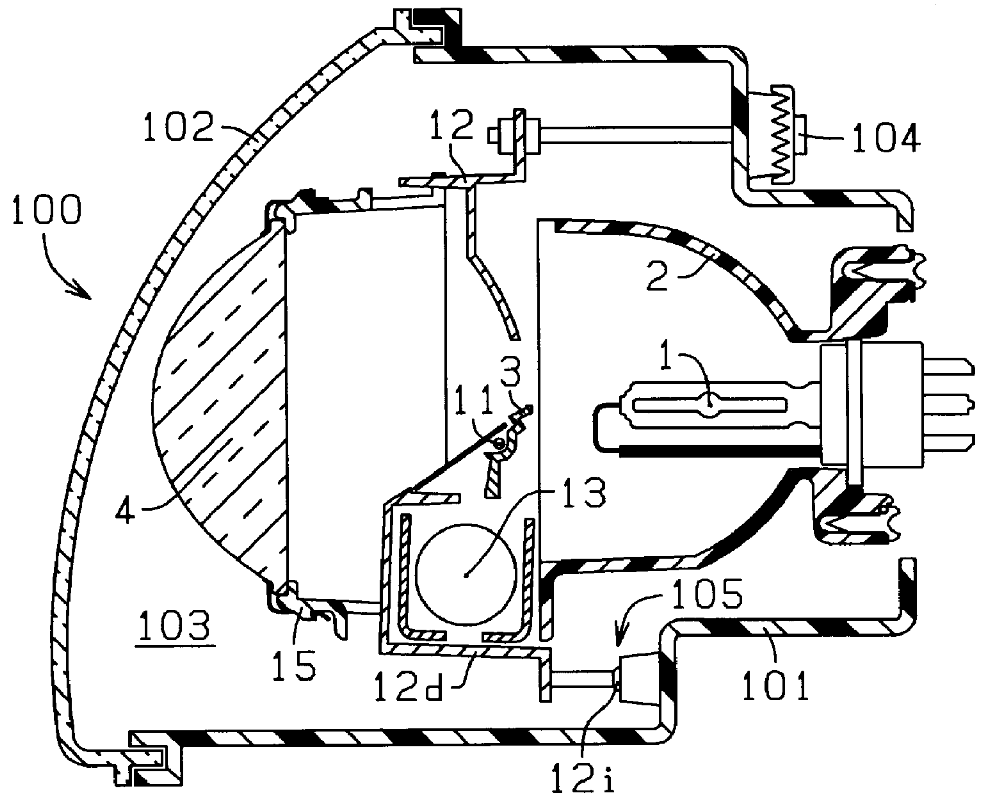
FIG. 3 is a schematic cross-sectional view illustrating a first exemplary embodiment of a projector type vehicle headlight made in accordance with principles of the presently disclosed subject matter when viewed from its right side.

A description will now be made below to projector type vehicle lights of the presently disclosed subject matter with reference to the accompanying drawings in accordance with exemplary embodiments. FIG. 3 is a schematic cross-sectional view illustrating a projector type vehicle headlight 100 of a first exemplary embodiment cut along the front-to-rear direction.

As shown in FIG. 3, the projector type vehicle headlight 100 of the first exemplary embodiment can include a light source 1 such as a bulb, a reflector 2 configured to reflect light from the light source 1, a shade 3 configured to shield part of the light received from the reflector 2, and a projection lens 4 configured to project light not shielded by the shade 3.

The reflector 2 can be a molded article made of a resin material and can include a reflecting surface with deposited aluminum. The presently disclosed subject matter is not limited to this particular embodiment, and the reflector 2 can be made of a metal material such as a die cast aluminum part, etc.

The shade 3 can be a die cast aluminum part. The presently disclosed subject matter is not limited to this particular embodiment, and the shade 3 can be made of any appropriate material such as a sheet metal, ceramic, coated plastic, etc.

The projector lens 4 can be made of a transparent resin material in a predetermined shape.

The reflector 2 can be connected to the projector lens 4 via the base member 12 and the lens holder 15.

The base member 12 can be a die cast aluminum part. The presently disclosed subject matter is not limited to this particular embodiment, and the base member 12 can be formed of any appropriate material such as a resin material, etc.

The lens holder 15 can be a molded article made of a resin material. The presently disclosed subject matter is not limited to this particular embodiment, and the lens holder 15 can be formed of any appropriate material such as a metal material, etc.

The shade 3 can be supported by the base member 12 so that the shade 3 can rotate freely around the shade rotational shaft 11 extending in the right-to-left direction of the projector type vehicle headlight 100. In this illustrated example, the shade 3 and the shade rotational shaft 11 can be formed of respective separate members. However, the presently disclosed subject matter is not limited to a particular embodiment. Instead, the shade 3 and the shade rotational shaft 11 can be formed as a single part member for example that is integrally formed of a single continuous material.

The projector type vehicle headlight can include a light emitting direction along an optical axis with both the light emitting direction and optical axis extending substantially leftward and horizontally as shown with respect to FIG. 3.

Figure 8:
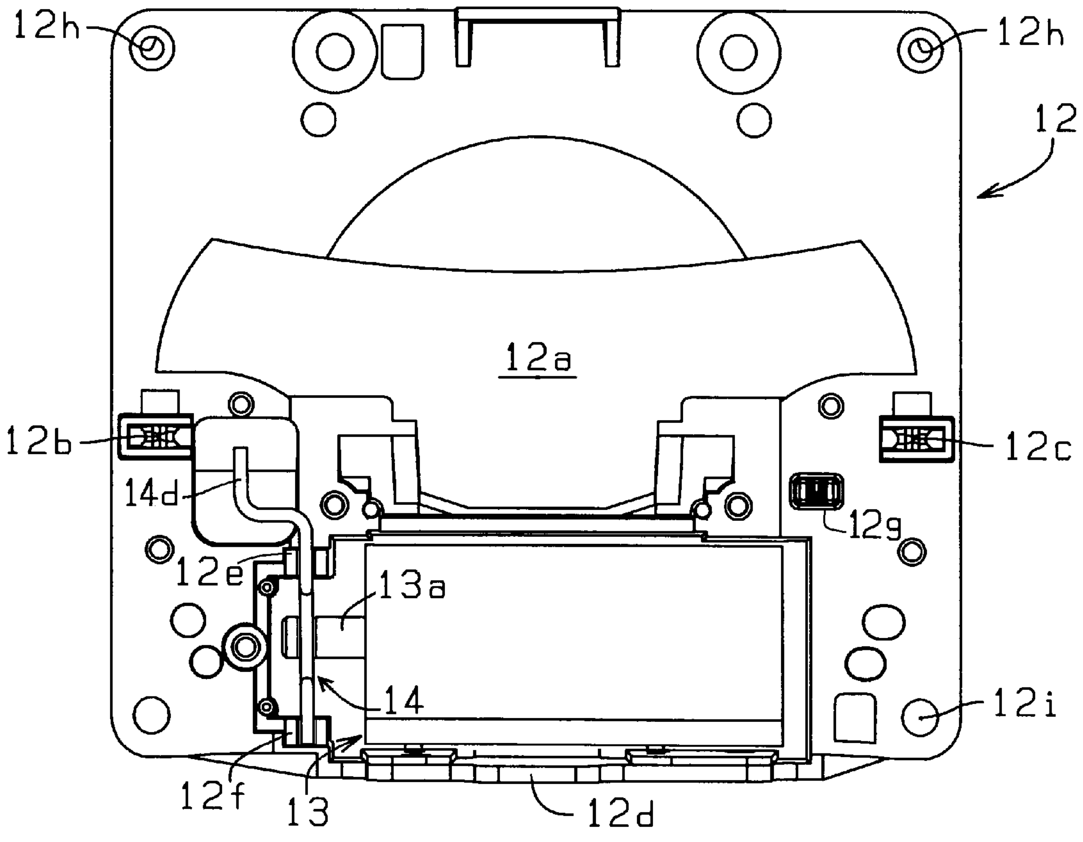
FIG. 8 is a schematic view illustrating the assembly of the base member, the solenoid, and the crank shaft of FIG. 3.

In the projector type vehicle headlight 100 of the first exemplary embodiment, as shown in FIGS. 3 and 8, the solenoid 13 can be configured to rotate and move the shade 3 between the low-beam position and the high-beam position. This solenoid 13 can be installed in the seat portion 12*d* of the base member 12.

As shown in FIG. 3, in the projector type vehicle headlight 100 of the first exemplary embodiment, the light source 1, the reflector 2, the base member 12, the shade 3, the solenoid 13, the lens holder 15, and the projector lens 4 constitute a single assembly. The vehicle headlight 100 can further include a housing 101 and a cover lens 102 together defining a lighting chamber 103. This assembly can be disposed within the lighting chamber 103. Specifically, the assembly and the housing 101 are connected to each other via an aiming screw 104 and a ball joint 105. However, the presently disclosed subject matter is not limited to the particular connection structure between the housing 101 and the assembly. For example, an adaptive front lighting system (referred to as "AFS") for horizontally changing the optical axis of a headlight can be disposed between the assembly and the housing 101.

Figure 4A:
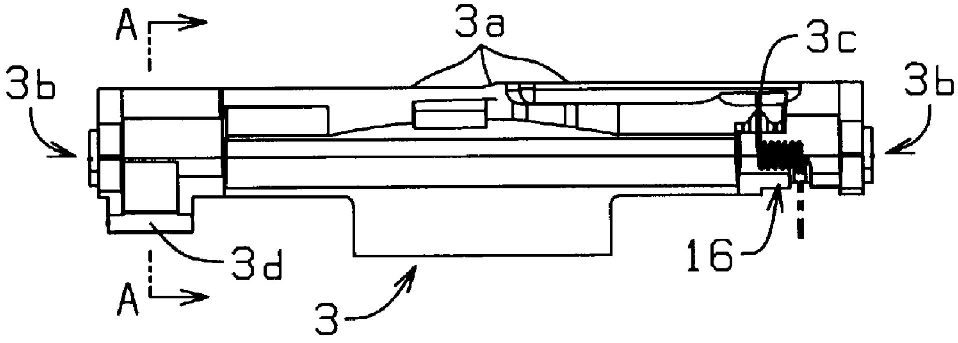
FIGS. 4A, 4B, and 4C are schematic diagrams illustrating parts of the shade of FIG. 3.
Figure 4B:
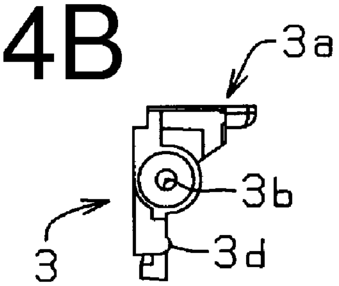
Figure 4C:
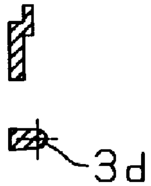
Figure 5:
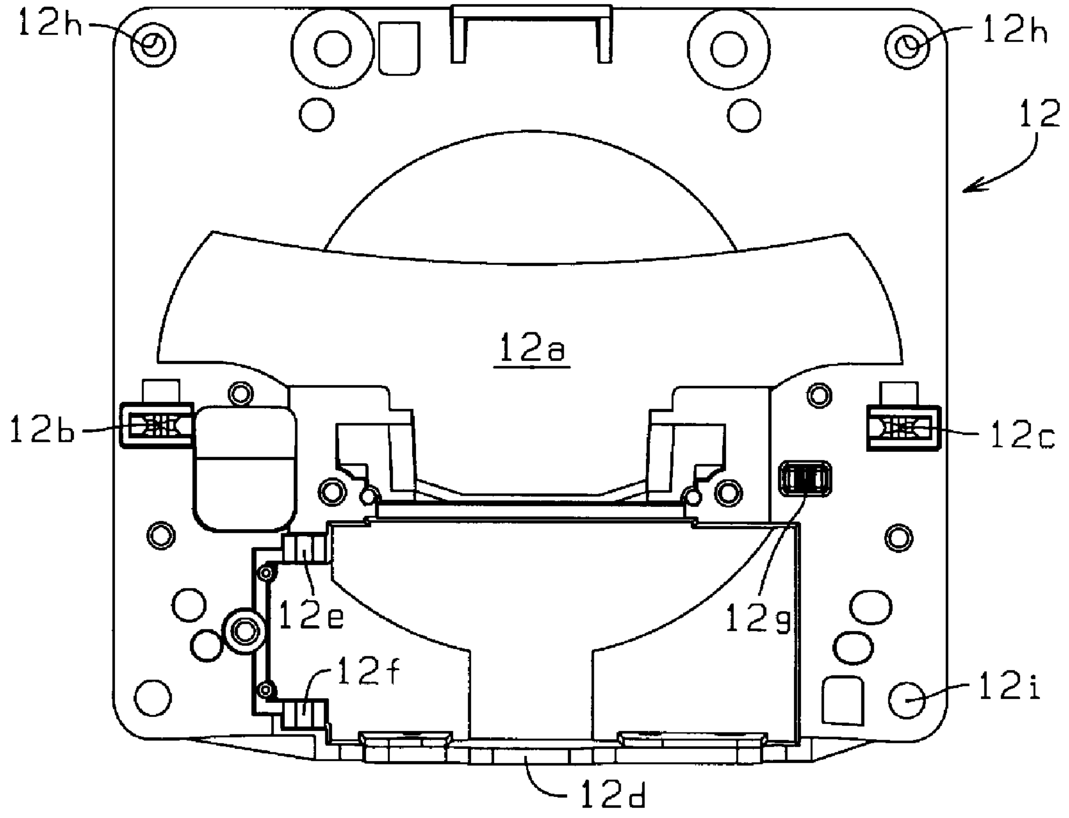
FIG. 5 is a rear side view of the base member of FIG. 3 (diagram illustrating the base member when viewed from rear side of the projector type vehicle headlight)

FIGS. 4A, 4B, and 4C show the shade 3 of FIG. 3. Specifically, FIG. 4A is a rear side view of the shade 3 and the like (as seen from the rear side of the projector type vehicle headlight 100 in which the shade 3 is installed). FIG. 4B is a right side view of the shade 3 (as seen from the left side of the shade 3 of FIG. 4A). FIG. 4C is a cross-sectional view taken along a line A-A in FIG. 4A. FIG. 5 is a rear side view of the base member 12 of FIG. 3 (as seen from the rear side of the projector type vehicle headlight 100 in which the base member 12 is installed).

Figure 6A:
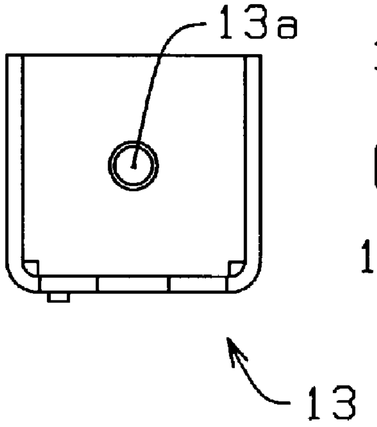
FIGS. 6A, 6B, and 6C are schematic diagrams of the solenoid of FIG. 3.
Figure 6B:
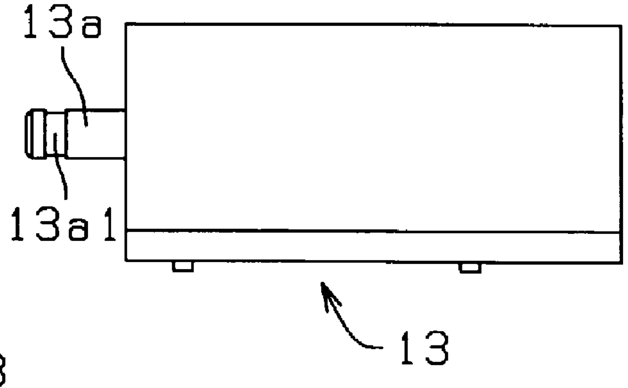
Figure 6C:
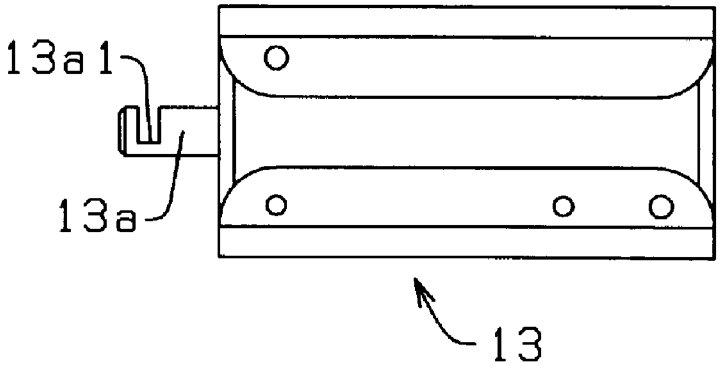

FIGS. 6A, 6B, and 6C are schematic diagrams of the solenoid 13 of FIG. 3. Specifically, FIG. 6A is a right side view of the solenoid 13 (as seen from the right side of the projector type vehicle headlight 100 in which the solenoid 13 is installed). FIG. 6B is a rear side view of the solenoid 13 (as seen from the rear side of the projector type vehicle headlight 100 in which the solenoid 13 is installed). FIG. 6C is a bottom view of the solenoid 13 (as seen from the bottom side of the projector type vehicle headlight 100 in which the solenoid 13 is installed).

Figure 7A:
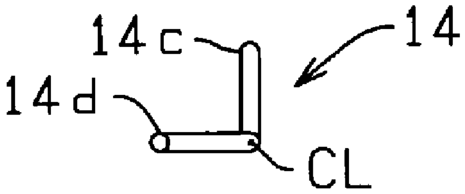
FIGS. 7A, 7B, and 7C are schematic diagrams of the crank shaft of FIG. 3 for connecting the plunger of the solenoid with the shade for driving the shade.
Figure 7B:
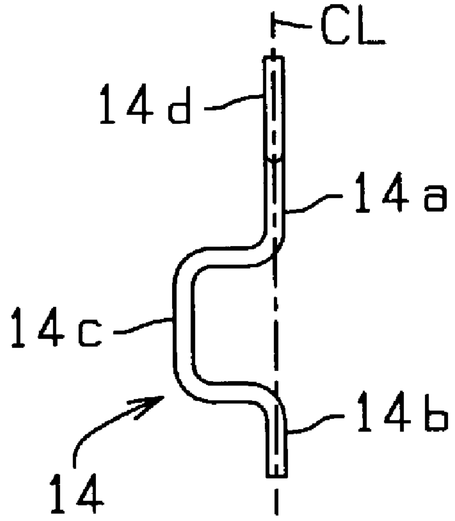
Figure 7C:
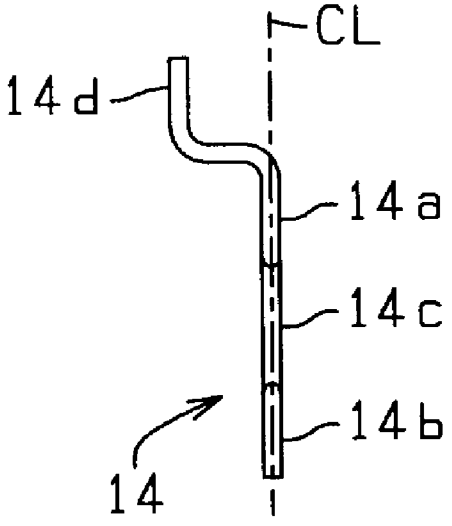

FIGS. 7A, 7B, and 7C are schematic diagrams of the crank shaft 14 of FIG. 3 for connecting the plunger 13*a* of the solenoid 13 with the shade for driving. Specifically, FIG. 7A is a plan view of the crank shaft 14 (as seen from the upper side of the projector type vehicle headlight 100 in which the crank shaft 14 is installed). FIG. 7B is a right side view of the crank shaft 14 (as seen from the right side of the projector type vehicle headlight 100 in which the crank shaft 14 is installed). FIG. 7C is a rear side view of the crank shaft 14 (as seen from the rear side of the projector type vehicle headlight 100 in which the crank shaft 14 is installed).

In the projector type vehicle headlight 100 of the first exemplary embodiment as shown in FIGS. 3, 4A, 4B, and 4C, the upper edge 3*a* of the shade 3 contributes to form the cutoff line for forming the low-beam light distribution pattern. Furthermore, the shade rotational shaft 11 can be inserted into an insertion hole 3*b* of the shade 3. A coil spring 16 can be provided, and can include one end which is engaged with a coil engagement portion 3*c* of the shade 3 for urging the shade 3 toward the low-beam position.

The output part 14*d* of the crank shaft 14 (see FIGS. 7A, 7B, and 7C) is allowed to abut against the abutment portion 3*d* of the shade 3 (see FIGS. 4A, 4B, and 4C) to rotate the shade 3 from the low-beam position to the high-beam position.

The base member 12 can include an opening 12*a* substantially at its center area (see FIG. 5). Accordingly, the light reflected from the reflector 2 is allowed to pass through the opening 12*a* of the base member 12.

The right end portion of the shade rotational shaft 11 can be supported by a groove 12*b* of the base member 12 to be freely rotated while the left end portion of the shade rotational shaft 11 can be supported by a groove 12*c* of the base member 12. Specifically, for example, the right end portion and left end portion of the shade rotational shaft 11 are inserted into the respective grooves 12*b* and 12*c* of the base member 12, and cover members (not shown) cover the respective grooves 12*b* and 12*c* of the base member 12 to complete the supporting structure.

On the other hand, as shown in FIGS. 7A, 7B, and 7C, the crank shaft 14 can include an input part 14*c*, upper and lower supported parts 14*a* and 14*b*, and an output part 14*d*. The upper and lower supported parts 14*a* and 14*b* can be rotatably supported by respective grooves 12*e* and 12*f* of the base member 12 (see FIG. 8). Specifically, for example, the upper and lower supported parts 14*a* and 14*b* of the crank shaft 14 can be inserted into the respective grooves 12*e* and 12*f* of the base member 12, and cover members (not shown) cover the respective grooves 12*e* and 12*f* of the base member 12 to complete the supporting structure.

Further the other end of the coil spring 16 can be engaged with a coil engagement portion 12*g* of the base member 12 for urging the shade 3 toward the low-beam position (see FIGS. 4A, 5, and 8).

As shown in FIGS. 3 and 5, the male screw of the aiming screw 104 is screwed into the female screw 12*h* of the base member 12. Part of the ball joint 105 is constituted by the ball part 12*i* of the base member 12.

Furthermore, as shown in FIGS. 7A, 7B, 7C, 8, 9B, and 9D, the output part 14*c* of the crank shaft 14 can be fit into the groove 13*a*1 of the plunger 13*a* of the solenoid 13.

FIGS. 9A, 9B, 9C, and 9D illustrate an exemplary linkage mechanism for rotating and moving the shade 3 between the low-beam position and the high-beam position. Specifically, FIG. 9A is a right side view of the crank shaft 14 and the shade 3 which is disposed at the low-beam position (where the shade 3 shields part of the light path). FIG. 9B is a plan view of the solenoid 13 and the crank shaft 14 in the state where the shade 3 is disposed at the low-beam position. FIG. 9C is a right side view of the crank shaft 14 and the shade 3 which is disposed at the high-beam position (where the shade 3 is retracted from the light path). FIG. 9D is a plan view of the solenoid 13 and the crank shaft 14 in the state where the shade 3 is disposed at the high-beam position.

In the projector type vehicle headlight 100 of the first exemplary embodiment, the solenoid 13 is turned off (see FIG. 9B) when the low-beam light distribution pattern is to be formed. In this case, the plunger 13*a* of the solenoid 13 is not retracted. Then, the shade 3 is urged by the coil spring 16 (see FIG. 4A) toward the low-beam position (FIG. 9A). As a result, as shown in FIGS. 3 and 9A, the upper edge 3*a* of the shade 3 is disposed to shield the light path of light reflected from the reflector 2. Therefore, the upper edge 3*a* of the shade 3 can form the cut-off line of the low-beam light distribution pattern.

When the high-beam light distribution pattern is to be formed, the solenoid 13 is turned on (see FIG. 9D). Then, as shown by the arrow B in FIG. 9D, the plunger 13*a* of the solenoid 13 is retracted. As a result, as shown by the arrow C in FIG. 9D, the crank shaft 14 is allowed to be rotated around the rotational center axis CL. Consequently, the output part 14*d* of the crank shaft 14 pushes the abutment portion 3*d* of the shade 3 to move and rotate the shade 3 around the shade rotational shaft 11 (located in through hole 3*b*) as shown by the arrow D in FIG. 9C (see FIG. 3). As a result, the upper edge 3*a* of the shade 3 is retracted from the light path of light reflected from the reflector 2 to form the high-beam light distribution pattern.

The solenoid 13 is disposed such that the moving direction of the plunger 13*a* of the solenoid 13 is aligned with the left-to-right direction of the projector type vehicle headlight 100 (in the perpendicular and normal to paper direction of FIG. 3 and in the left-to-right direction in FIGS. 9B and 9D). Accordingly, when compared to the case where the solenoid 13 is disposed so that the moving direction of the plunger 13*a* of the solenoid 13 is aligned with the front-to-rear direction of the projector type vehicle headlight 100 (in the left-to-right direction in FIG. 3), the size in the front-to-rear direction of the projector type vehicle headlight can be miniaturized.

In addition, the projector type vehicle headlight 100 of the first exemplary embodiment is configured such that the shade 3 is disposed just above the solenoid 13 as shown in FIG. 3. Accordingly, when compared to the case where the solenoid 13 is disposed behind the shade 3 (at the right side of FIG. 3), it is possible to prevent the solenoid 13 from being heated by the light source 1. Furthermore, when compared with the case where the solenoid 13 is disposed before the shade 3 (at the left side of FIG. 3), the distance between the shade 3 and the projection lens 4 can be reduced.

The projector type vehicle headlight 100 of the first exemplary embodiment can prevent temperature increase of the solenoid 13 due to the heat from the light source 1 as well as reduce a distance between the shade 3 and the projection lens 4.

Furthermore, the rotational center axis CL of the crank shaft 14 can be configured to extend in the vertical direction of the projector type vehicle headlight 100. The base member 12 can be formed with the grooves 12*e* and 12*f* which can function as a bearing for rotatably supporting the crank shaft 14. The grooves 12*e* and 12*f* can be disposed above and below the plunger 13*a* of the solenoid 13 (see FIG. 8).

Accordingly, when compared with the case where a bearing for rotatably supporting the crank shaft 14 is provided only above or below the plunger 13*a* of the solenoid, the axial deviation of the crank shaft 14 can be minimized so that the crank shaft 14 can smoothly rotate.

When the solenoid 13 is turned on or off in the projector type vehicle headlight 100 of the first exemplary embodiment, the plunger 13*a* of the solenoid 13 can move in the left-to-right direction of the projector type vehicle headlight 100 (in the left-to-right direction in FIGS. 9B and 9D). In this case, the rotational center axis CL of the crank shaft 14 extends in the vertical direction of the projector type vehicle headlight 100 (in the perpendicular and normal to paper direction for FIGS. 9B and 9D), and the plunger 13*a* of the solenoid 13 can linearly move. Then, the trajectory of the contact point between the crank shaft 14 and the plunger 13*a* of the solenoid 13 becomes an approximately arc around the rotational center axis CL as a center.

Figure 1:
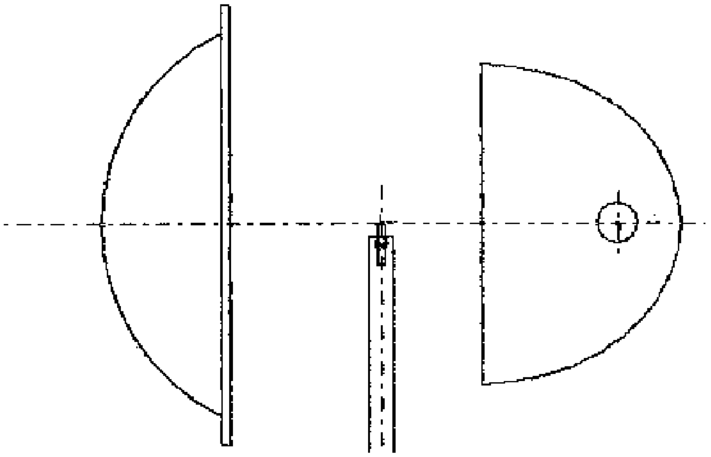
Fig. 1 Conventional Art
FIG. 1 is a cross-sectional view illustrating a conventional projector type vehicle headlight (corresponding to FIG. 1 of Japanese Patent Application Laid-Open No. 2007-213938)
Figure 2:
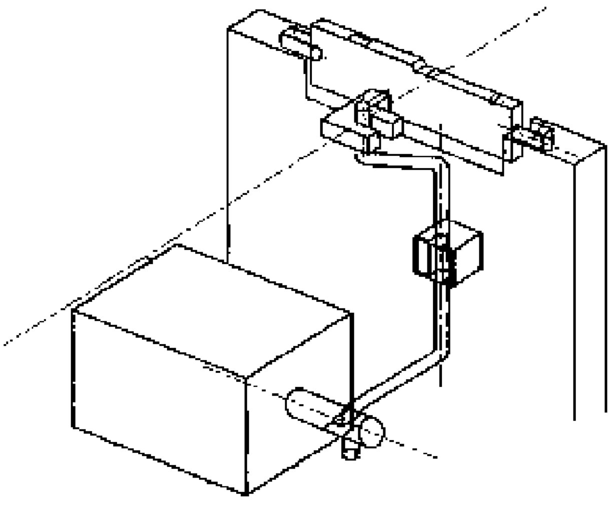
Fig. 2 Conventional Art
FIG. 2 is a perspective view illustrating a shade and surrounding parts of the conventional projector type vehicle headlight (corresponding to FIG. 4 of Japanese Patent Application Laid-Open No. 2007-213938)

If a crank shaft is fit into a cylindrical hole of a plunger that linearly moves in a projector type vehicle headlight as shown in FIG. 2 (corresponding to FIG. 4 of Japanese Patent Application Laid-Open No. 2007-213938), the contact point between the crank shaft and the plunger of the solenoid cannot move on an arc, meaning that the crank shaft cannot smoothly move.

In view of this, as shown in FIGS. 9B and 9D the plunger 13*a* of the solenoid 13 of the projector type vehicle headlight 100 of the first exemplary embodiment has a groove 13*a*1 opened rearward (lower side in FIGS. 9B and 9D). The crank shaft 14 is fit in the groove 13*a*1 of the plunger 13*a* of the solenoid 13.

In this state, the solenoid 13 is turned on or off to move the plunger 13*a* of the solenoid 13 in the left-to-right direction of the projector type vehicle headlight 100 (in the left-to-right direction in FIGS. 9B and 9D). The input part 14*c* of the crank shaft 14 can be fit into the groove 13*a*1 of the plunger 13*a* of the solenoid 13 so that it relatively moves within the groove 13*a*1 in the front-to-rear direction of the projector type vehicle headlight 100 with respect to the plunger 13*a* (in the vertical direction in FIGS. 9B and 9D).

As a result, in the projector type vehicle headlight 100 of the first exemplary embodiment, the contact point between the crank shaft 14 and the plunger 13*a* of the solenoid 13 can move on the approximate arc so that the crank shaft 14 can smoothly rotate.

When the solenoid 13 is turned on or off and the crank shaft 14 is made to rotate, the trajectory of the contact point between the crank shaft 14 and the shade 3 can be an approximate arc when viewed from above (plan view) and from its side (side view).

If a crank shaft is fit into a groove of a shade in a projector type vehicle headlight as shown in FIG. 2 (corresponding to FIG. 4 of Japanese Patent Application Laid-Open No. 2007-213938), the contact point between the crank shaft and the shade cannot move on an arc, meaning that the crank shaft and the shade cannot smoothly rotate.

In view of this, the shade 3 of the projector type vehicle headlight 100 of the first exemplary embodiment can include an abutment portion 3*d* configured such that the output part 14*d* of the crank shaft 14 can abut against the abutment portion 3*d* (see FIGS. 9A, 9B, 9C, and 9D), and the abutment portion 3*d* can be formed by a half of an approximate cylindrical surface extending in the left-to-right direction of the projector type vehicle headlight 100 (in the perpendicular and normal to paper direction in FIGS. 4B and 4C).

In this state, when the solenoid 13 is turned on or off to rotate the crank shaft 14, the output part 14*d* of the crank shaft 14 can move on the half cylindrical surface of the abutment portion 3*d* of the shade 3.

As a result, the contact point between the output part 14*d* of the crank shaft 14 and the abutment portion 3*d* of the shade 3 can move on the approximate arc trajectory as seen in a plan view in the projector type vehicle headlight 100 of the first exemplary embodiment. Furthermore, the contact point between the output part 14*d* of the crank shaft 14 and the abutment portion 3*d* of the shade 3 can move on the approximate arc trajectory as seen in a side view so that the crank shaft 14 and the shade 3 can smoothly rotate.

It should be noted that various exemplary embodiments can be combined with one another, and fall within the scope of the presently disclosed subject matter.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related and conventional art references described above are hereby incorporated in their entirety by reference.

What is claimed is:

1. A projector type vehicle light configured to project light in a light emitting direction and along an optical axis, comprising:

a light source;

a reflector configured to reflect light from the light source;

a shade configured to shield part of light received from the reflector, the shade including a shade rotational shaft extending in a left-to-right direction of the projector type vehicle light;

a projection lens configured to project light not shielded by the shade;

a base member configured to support the shade so that the shade can rotate around the shade rotational shaft;

a solenoid having a plunger for making the shade rotate between a low-beam position and a high-beam position, the solenoid being disposed just below the shade so that a moving direction of the plunger is substantially parallel with the left-to-right direction of the projector type vehicle light; and a crank shaft configured to connect the solenoid with the shade for driving the shade.

2. The projector type vehicle light according to claim 1, wherein the crank shaft includes a rotational center line extending in a vertical direction of the projector type vehicle light, the vertical direction being substantially perpendicular to both the optical axis and the left-to-right direction, and wherein the base member includes bearing portions configured to rotatably support the crank shaft, the bearing portions disposed vertically with the plunger of the solenoid interposed therebetween.

3. The projector type vehicle light according to claim 2, wherein the plunger of the solenoid has a groove opened toward one direction and the crank shaft is fit in the groove of the plunger.

4. The projector type vehicle light according to claim 3, wherein the groove is opened rearward and in a direction substantially opposed to the light emitting direction of the light.

5. The projector type vehicle light according to claim 3, wherein the shade has an abutment portion configured such that the crank shaft abuts against the abutment portion of the shade, and wherein the abutment portion includes a half of a cylindrical surface extending in the left-to-right direction of the projector type vehicle light.

6. The projector type vehicle light according to claim 1, wherein the light is configured as a vehicle headlight.

7. The projector type vehicle light according to claim 1, wherein the shade has an abutment portion configured such that the crank shaft abuts against the abutment portion of the shade at a contact point, and the crank shaft and shade are configured such that when the solenoid is actuated and the plunger moves, the contact point moves about an arcuate trajectory.

8. The projector type vehicle light according to claim 7, wherein the crank shaft and shade are configured such that when the solenoid is actuated and the plunger moves, the contact point moves about a semicircle trajectory.

9. The projector type vehicle light according to claim 1, wherein the shade is located at a first position along an optical axis direction of the vehicle light and the solenoid is located at the same first position along the optical axis direction of the vehicle light, and the shade is located at a position spaced from the optical axis and the solenoid is located at a position spaced further from the optical axis than the position of the shade.

10. The projector type vehicle light according to claim 2, wherein the bearing portions of the base member include a first bearing portion directly connected to a first portion of the crank shaft and a second bearing portion directly connected to a second portion of the crank shaft such that the rotational center line of the crank shaft intersects the first bearing portion and second bearing portion and the plunger contacts the crank shaft at a location between the first bearing portion and the second bearing portion, and the rotational center line of the crank shaft is substantially perpendicular with the moving direction of the plunger.

11. A projector type vehicle light configured to project light in a light emitting direction and along an optical axis, comprising:

a light source;

a reflector configured to reflect light from the light source;

a shade configured to shield part of light received from the reflector, the shade configured to rotate about a rotational axis that is substantially perpendicular to the optical axis of the light;

a projection lens configured to project light not shielded by the shade;

a base member configured to support the shade so that the shade can rotate around the rotational axis;

a solenoid having a plunger configured to move linearly along an extension axis, the extension axis being substantially perpendicular to the optical axis of the light and substantially parallel with the rotational axis of the shade; and a crank shaft in operative contact with the solenoid and the shade to rotate the shade when the solenoid is actuated, wherein the solenoid and the shade are positioned such that an imaginary line extending perpendicular to the optical axis of the light intersects both the solenoid and the shade.

12. The projector type vehicle light according to claim 11, wherein the crank shaft includes a rotational center line extending in a vertical direction of the projector type vehicle light, the vertical direction being substantially perpendicular to both the optical axis and the rotational axis of the shade, and wherein the base member includes bearing portions rotatably supporting the crank shaft, the bearing portions disposed vertically with the plunger of the solenoid interposed therebetween.

13. The projector type vehicle light according to claim 11, wherein the plunger of the solenoid has a groove opened toward a direction opposed to the light emitting direction of the vehicle light, and the crank shaft is fit in the groove of the plunger.

14. The projector type vehicle light according to claim 11, wherein the shade has an abutment portion configured such that the crank shaft abuts against the abutment portion of the shade, and wherein the abutment portion includes a semi-cylindrical surface.

15. The projector type vehicle light according to claim 11, wherein the shade has an abutment portion configured such that the crank shaft abuts against the abutment portion of the shade at a contact point, and the crank shaft and shade are configured such that when the solenoid is actuated and the plunger moves, the contact point moves about an arcuate trajectory.

16. The projector type vehicle light according to claim 15, wherein the crank shaft and shade are configured such that when the solenoid is actuated and the plunger moves, the contact point moves about a semicircle trajectory.

17. The projector type vehicle light according to claim 11, wherein the light is configured as a vehicle headlight.

18. The projector type vehicle light according to claim 11, wherein the crank shaft includes a rotational center line extending in a vertical direction of the projector type vehicle light, the vertical direction being substantially perpendicular to both the optical axis and the rotational axis of the shade, and wherein the base member includes a first bearing portion directly connected to a first portion of the crank shaft and a second bearing portion directly connected to a second portion of the crank shaft, the first bearing portion being different from and separated from the second bearing portion with the plunger of the solenoid in contact with the crank shaft at a portion of the crank shaft located between the first bearing portion and second bearing portion, such that the rotational center line of the crank shaft intersects the first bearing portion and second bearing portion, and the rotational center line of the crank shaft is substantially parallel with the extension axis of the plunger.

* * * * *